(12) United States Patent
Singer et al.

(10) Patent No.: US 7,954,999 B2
(45) Date of Patent: Jun. 7, 2011

(54) END PROFILE ON SLIDE BEARING COMPLEMENTARY ELEMENTS FOR REDUCING SURFACE PRESSURE

(75) Inventors: Johann Singer, Grossenseebach (DE); Stefan Doliwa, Waldspitze (DE)

(73) Assignee: Schaeffler KG, Herzogenaurach (DE)

( * ) Notice: Subject to any disclaimer, the term of this patent is extended or adjusted under 35 U.S.C. 154(b) by 504 days.

(21) Appl. No.: 11/721,842

(22) PCT Filed: Nov. 10, 2005

(86) PCT No.: PCT/EP2005/012025
§ 371 (c)(1),
(2), (4) Date: Jul. 9, 2007

(87) PCT Pub. No.: WO2006/063638
PCT Pub. Date: Jun. 22, 2006

(65) Prior Publication Data
US 2009/0097789 A1    Apr. 16, 2009

(30) Foreign Application Priority Data
Dec. 18, 2004   (DE) .......................... 10 2004 061 097

(51) Int. Cl.
*F16C 33/02* (2006.01)
*F16C 17/00* (2006.01)

(52) U.S. Cl. ...................................... 384/276; 384/302

(58) Field of Classification Search .......... 384/271–273, 384/276–279, 282, 570, 213, 625, 902, 302; 474/133–135
See application file for complete search history.

(56) References Cited

U.S. PATENT DOCUMENTS

| | | | | |
|---|---|---|---|---|
| 1,831,999 A * | 11/1931 | Bull | ............................. | 384/570 |
| 2,734,223 A | 2/1956 | Park | | |
| 3,104,921 A * | 9/1963 | Newcomer | ..................... | 384/213 |
| 3,674,355 A * | 7/1972 | Yearout et al. | ................. | 84/110 |
| 3,929,393 A * | 12/1975 | Marantette et al. | ........... | 384/315 |
| 5,288,276 A * | 2/1994 | Golovatgai-Schmidt et al. | ............................. | 474/133 |
| 5,407,397 A * | 4/1995 | Foley | ............................ | 474/135 |
| 5,667,442 A * | 9/1997 | Tanaka | ............................ | 464/49 |
| 5,878,856 A * | 3/1999 | Sudau et al. | ............... | 192/70.17 |
| 6,039,664 A * | 3/2000 | Schmid | ........................ | 474/135 |
| 6,042,778 A * | 3/2000 | Kraft et al. | ...................... | 419/27 |
| 6,231,465 B1 * | 5/2001 | Quintus | ........................ | 474/133 |
| 6,695,480 B1 * | 2/2004 | Ramsay et al. | ............... | 384/110 |
| 6,901,639 B2 * | 6/2005 | Freiberg et al. | .................... | 26/89 |
| 7,033,529 B2 * | 4/2006 | Becquerelle et al. | ......... | 264/127 |
| 7,101,285 B2 * | 9/2006 | Sekine | ............................ | 464/14 |
| 2002/0126924 A1 | 9/2002 | Okamoto et al. | | |
| 2005/0061143 A1 * | 3/2005 | Koelzer | ........................... | 92/71 |

FOREIGN PATENT DOCUMENTS

| | | |
|---|---|---|
| DE | 748858 Y | 11/1944 |
| DE | 26895 Y | 12/1956 |
| DE | 1110599 Y | 7/1961 |

(Continued)

*Primary Examiner* — Marcus Charles
(74) *Attorney, Agent, or Firm* — Lucas & Mercanti, LLP

(57) ABSTRACT

The invention relates to an end profile on slide bearing complementary elements having a pin (22) and at least one bearing sleeve (24, 24') for receiving the pin (22), said pin (22) absorbing an eccentric force (F) which acts perpendicularly with respect to the pin/bearing sleeve unit (20), and the at least one bearing sleeve (24, 24') being of cylindrical configuration and the pin (22) being of tapering configuration in a manner which extends from predefined positions in each case toward the axial end. In addition, a geometrically opposed geometry of the pin and the bearing sleeve is claimed.

5 Claims, 5 Drawing Sheets

FOREIGN PATENT DOCUMENTS

| | | | |
|---|---|---|---|
| DE | 2615212 Y | 10/1977 | |
| DE | 3144720 X | 5/1985 | |
| DE | 8430030.2 Y | 9/1987 | |
| DE | 3921975 X | 3/1990 | |
| DE | 4034808 Y | 5/1991 | |
| DE | 4239938 Y | 4/1994 | |
| DE | 19526852 Y | 1/1997 | |
| DE | 19533457 YD | 3/1997 | |
| DE | 10028968 Y | 12/2001 | |
| DE | 10130253 Y | 1/2003 | |
| DE | 10236113 YD | 4/2004 | |
| FR | 2162824 Y | 7/1973 | |
| GB | 1380947 A | 1/1975 | |
| GB | 2269212 A | 2/1994 | |
| GB | 2354291 Y | 3/2001 | |
| JP | 07190049 A | * | 7/1995 |
| JP | 10220464 A | * | 8/1998 |
| JP | 11230160 XA | | 8/1999 |
| JP | 2002 130403 A | | 5/2002 |
| SU | 931424 B | * | 5/1982 |

* cited by examiner

END PROFILE ON SLIDE BEARING COMPLEMENTARY ELEMENTS FOR REDUCING SURFACE PRESSURE

FIELD OF THE INVENTION

The invention relates to an end profile on slide bearing complementary elements for reducing surface pressure, having a pin and at least one bearing sleeve for receiving the pin, the pin absorbing an eccentric force which acts perpendicularly with respect to the pin/bearing sleeve unit.

BACKGROUND OF THE INVENTION

It is known per se to configure an axial unit from a pin and at least one bearing sleeve for radially receiving the pin, the pin and the bearing sleeve forming slide bearing complementary elements which are assigned to one another. Here, the pin can absorb a force which acts perpendicularly with respect to the pin/bearing sleeve unit (slide bearing) and acts centrally or eccentrically on the pin.

A fastening unit comprising a pin/bearing sleeve unit of this type is customary, in particular, in commercially available belt tensioning systems. Belt tensioning systems are used, for example, in the timing drive or unit drive of vehicles having an internal combustion engine.

Belt tensioning systems having a tensioning roller which is arranged eccentrically in relation to the pin/bearing sleeve unit are known from the prior art, which tensioning roller is mounted rotatably via an eccentrically arranged roller bearing. It has been shown in the past that edge loading occurs between the pin and the bearing sleeve in a pin/bearing sleeve unit of belt tensioning systems having an eccentrically arranged tensioning roller. This edge loading causes an increased surface pressure on the pin and the bearing sleeve, with the consequence that the service life of said slide bearing can be reduced. In particular in the case of high eccentrically acting forces and a long service life, this leads to tilting, with the result that overall the guidance of the belt tensioning system is only insufficient for disruption-free operation.

Against this background, DE 195 33 457 A1 discloses a tensioning apparatus for a flexible drive having a piston which is loaded by a compression spring and is guided in a longitudinally displaceable manner for exerting a linear force on the flexible drive which is to be tensioned. In the disclosed tensioning apparatus, only centrally acting forces act on the bearing.

In contrast, DE 102 36 113 B3 has disclosed a rotary bearing having a slide bearing which has a stationary ceramic body having a bearing face. The ceramic material which is used has high wear resistance and can also provide a reliable and long-life rotary bearing in the case of high eccentrically acting forces and high temperatures (for example, as a result of friction).

It is disadvantageous here that the ceramic body can be introduced only with great expenditure into a slide bearing sleeve (bush) which is provided for receiving the ceramic body, as the material is difficult to introduce and requires a large amount of time on account of its dimensional stability. The ceramic body can be destroyed in the case of an increased pressing force on account of its brittle material property. The ceramic body can be introduced only by complicated and time-consuming heating of the slide bearing sleeve. This rotary bearing therefore proves to be complicated in assembly and expensive.

In addition, this document does not disclose a solution as to how wear phenomena which relate to the pin (the pin in a tensioning apparatus is not made from ceramic, but from hardened steel, for example) can be solved. Therefore, the service life of the known slide bearing is also comparatively low overall here. In addition, calibration or restriction of the tolerances likewise has negative effects on costs and service life.

OBJECT OF THE INVENTION

The invention is based on the object of indicating how an increase in the service life of a slide bearing can be achieved in a simple way and with low structural expenditure, with simultaneous adherence to current installation stipulations. A further object consists in extending the boundaries of use of a conventional slide bearing, to be precise with simultaneous retention of the tolerances which are necessary for mass production for a pin diameter, housing diameter and for a slide bearing wall thickness.

SUMMARY OF THE INVENTION

Accordingly, the invention relates to an end profile on slide bearing complementary elements having a pin and at least one bearing sleeve for receiving the pin, the pin absorbing an eccentric force which acts perpendicularly with respect to the pin/bearing sleeve unit, and the at least one bearing sleeve being of cylindrical configuration and the pin being of tapering configuration in a manner which extends from predefined positions in each case toward the axial end.

As a result of an end profile of this type, the contact face between the pin and the bearing sleeve is advantageously kept large, in particular in the case of an eccentric force action, with the result that the surface pressure in the pin/bearing sleeve unit is reduced considerably and the service life of the slide bearing is increased.

The bearing of tensioning units which are configured with regard to this comprises a steel pin and a maintenance-free multiple-component slide bearing pair which are pressed, for example, into a receiving hole in the lever or into a base plate of the tensioning unit. According to one concrete example, the alignment error between the sliding elements or their radial play should be at most 20 µm. Here, the surface pressure in this slide bearing is calculated from the acting force and the projected surface area which is loaded by the force. Wear phenomena are reduced significantly by the considerable increase in this loadbearing surface area, in association with a reduction in the surface pressure, as a result of which the service life of the slide bearing is increased.

In addition, it is advantageous that inexpensive materials can be used for the manufacture of the pin and the bearing sleeve, and that conventionally known manufacturing steps can be used for constructing the slide bearing. The service life of the slide bearing is therefore increased with constant manufacturing costs. In addition, current installation stipulations are adhered to and the boundaries of use of the slide bearing are extended with retention of the tolerances of the elements which are necessary for mass production.

The tapering of the pin is preferably of radial configuration. As a result of this "spherical" shape of the tapering of the pin, the surface pressure is reduced independently of the magnitude and direction of the eccentrically acting force. Here, the radius of the sphericity can be selected individually as a function of different application areas.

The abovementioned predefined positions are preferably arranged symmetrically with respect to the axial center point of the pin. A configuration of this type of the pin makes a uniformly reduced surface pressure possible on both sides, both on the left-hand and on the right-hand side of the slide bearing. In addition, a pin of symmetrical configuration can be manufactured inexpensively.

In an alternative embodiment, the pin is of cylindrical configuration and the inner side of the at least one bearing sleeve is of tapering configuration from predefined positions in each case toward the end. In this variant which is, as it were, "mirror-symmetrical" with respect to the first embodiment, the surface pressure is likewise reduced considerably. In comparison with the first embodiment, the manufacturing of this solution can prove to be disadvantageous, however, as the production of a bearing sleeve of tapering configuration is possibly more expensive than the manufacture of a pin of tapering configuration.

Here, the tapering of the bearing sleeve is preferably of radial configuration. Furthermore, the predefined positions are advantageously arranged symmetrically with respect to the axial center point of the at least one cylinder sleeve.

In a further advantageous refinement of both variants, the pin is mounted in two bearing sleeves. As a result of this refinement, the mounting takes place with a sufficient bearing surface area and a bearing region which is of long configuration at the same time, as a result of which a high torque which is exerted by an eccentrically acting force can be absorbed. In addition, axial friction forces are reduced. In general, material and manufacturing costs are therefore reduced. In the case of the tapered configuration of the bearing sleeve, the two bearing sleeves are then in each case of tapering configuration to the outside toward their ends.

The at least one bearing sleeve preferably comprises a sliding coating of bronze-PTFE on the inner side. Bronze-PTFE has satisfactory sliding and wear properties with satisfactory thermal conductivity and low cold flux. In mechanical engineering, bronze-PTFE is preferably used in slide coatings on carriage guides and, for example, also in slide bearings.

BRIEF DESCRIPTION OF THE DRAWINGS

The invention can be explained further using an exemplary embodiment. To this end, a drawing is appended to the description, in which drawing.

DETAILED DESCRIPTION OF THE DRAWINGS

Figure 4:
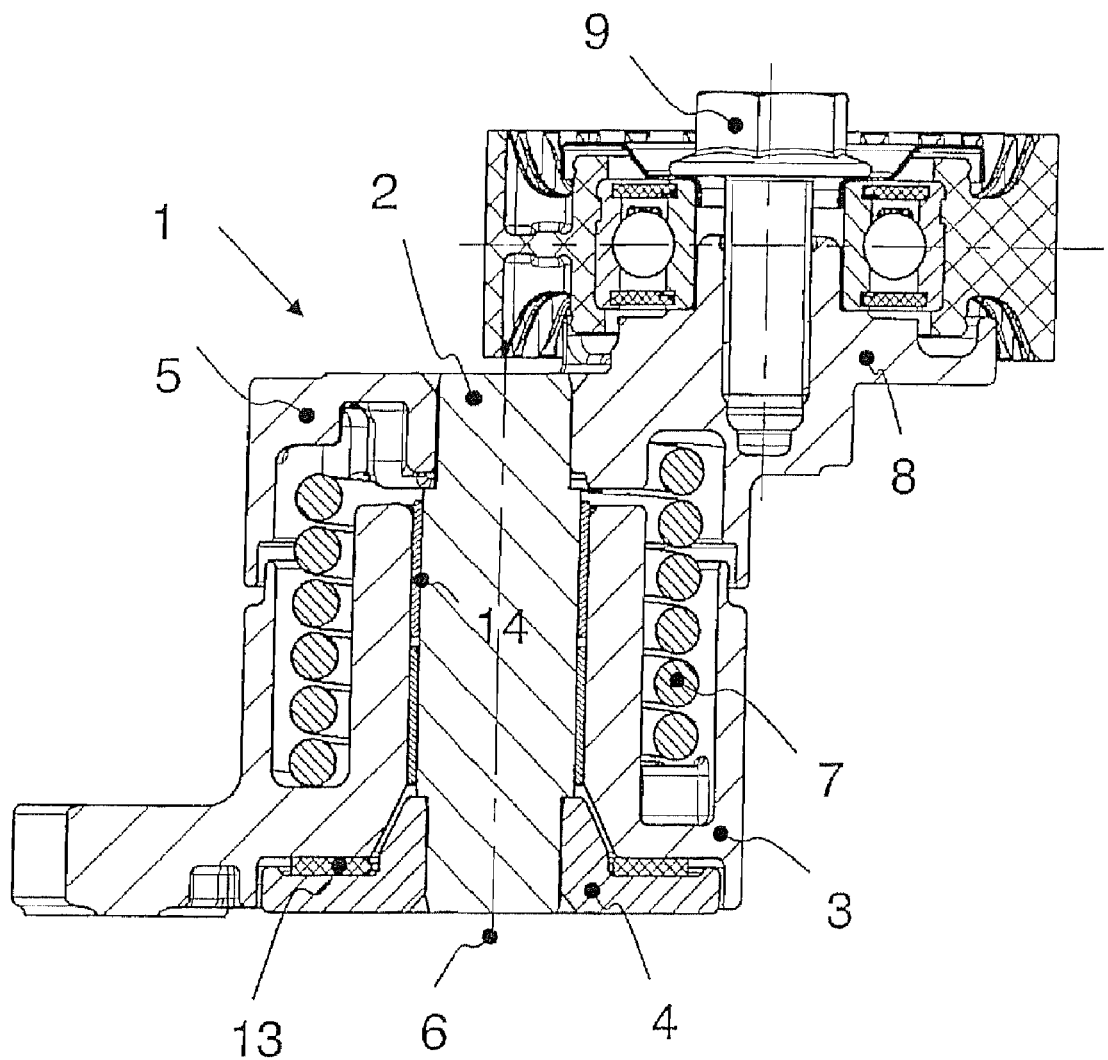
FIG. 4 shows a cross section through a belt tensioning system.
Figure 5:
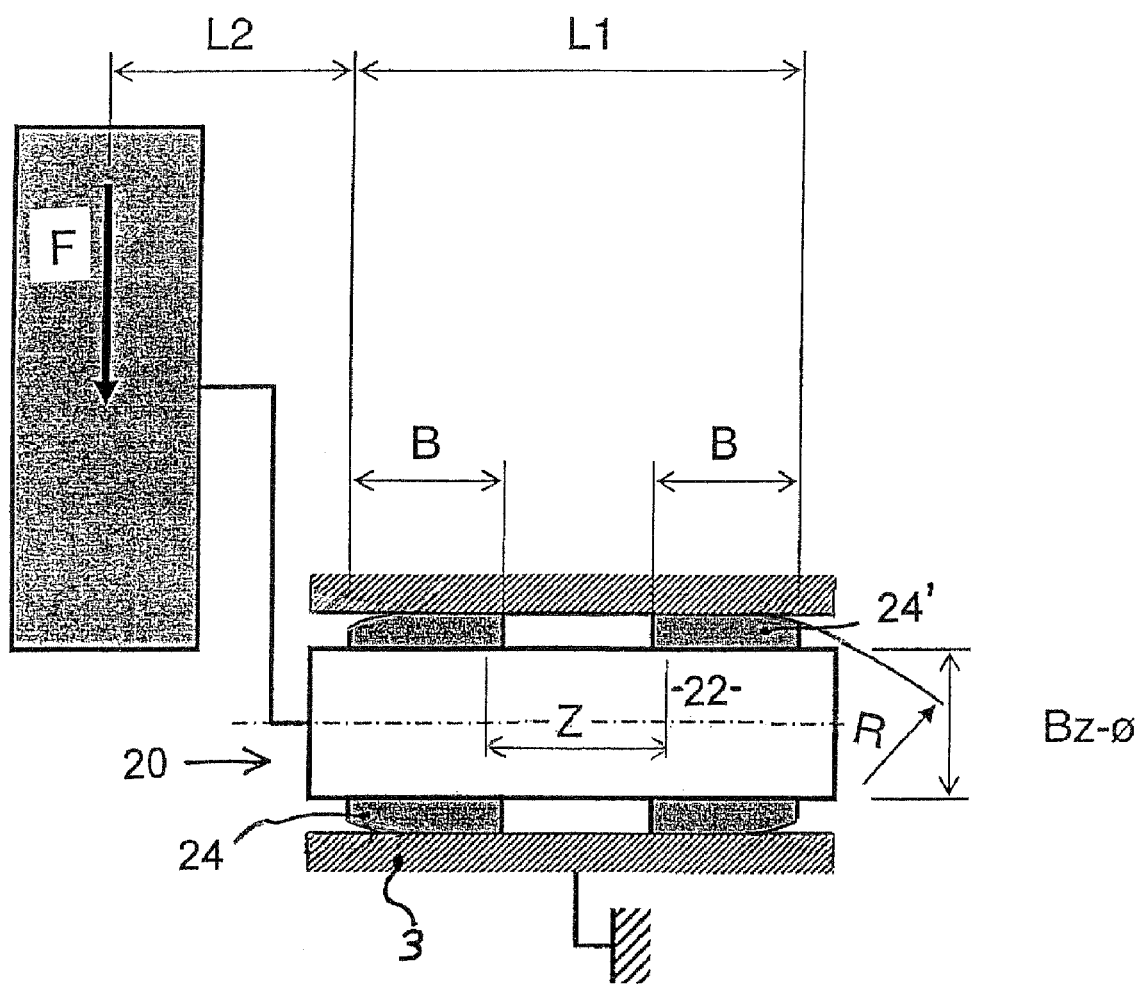
FIG. 5 shows an additional embodiment of the end profile of a pin/bearing sleeve unit according to the present invention.

Accordingly, FIG. 4 shows a cross section through a belt tensioning system 1 having an eccentrically arranged tensioning roller. The belt tensioning system 1 comprises a lower cylinder housing 3 and an upper cylinder housing 5 which have a largely identical external and internal diameter. The cylinder housings 3 and 5 are assembled axially in such a way that they can be rotated with respect to one another about the longitudinal axis 6. The upper cylinder housing 5 comprises a laterally attached lever 8, to which the tensioning roller is fastened by means of a screw 9.

The radially inner circumferential face of the upper cylinder housing 5 is connected fixedly in terms of rotation to an axial end of a hollow pin 2. At its other end, the pin 2 additionally carries a disk 4 which is fixed in terms of rotation, and on the circular face of which points to the lower cylinder housing 3 a friction lining 13 is arranged, which damps vibrations which are optionally coupled in from the flexible drive means in the case of a rotational movement of the upper cylinder housing 5, the pin 2 and the disk 4, with respect to the lower cylinder housing 3. It goes without saying that the pin 2 can also be configured without a hole.

In order to articulate the upper cylinder housing 5 against the lower cylinder housing 3, and thus in order to press a tensioning roller against a flexible drive means of a flexible drive, a helical spring 7 which exerts a force which acts in the circumferential direction on the upper cylinder housing 5 is arranged within the two cylinder housings 3 and 5. In addition, an axial force emanates from this helical spring 7 onto those base regions of the cylinder housings 3 and 5 which are assigned to the spring 7, with the result that the lower cylinder housing 3 is pressed against the friction lining 13 on the disk 4 with a perpendicular force.

There is additionally provision for a two-part slide bearing sleeve 14 which consists, for example, of steel with a sliding coating made from a bronze-PTFE matrix to be pressed into the radially inner circumferential face of the lower cylinder housing 3. The hollow pin 2 is received in this slide bearing sleeve 14, the outer circumferential face of said hollow pin 2 forming a friction pair with the slide bearing sleeve 14.

As FIG. 4 shows, the force which is applied to the tensioning roller leads to an eccentric loading of the slide bearing (pin 2, bearing sleeve 14). As a result of this, without the measures according to the invention, an increased edge loading of the slide bearing elements occurs which causes an increased surface pressure, with the consequence that the service life of the slide bearing is reduced.

Figure 3:
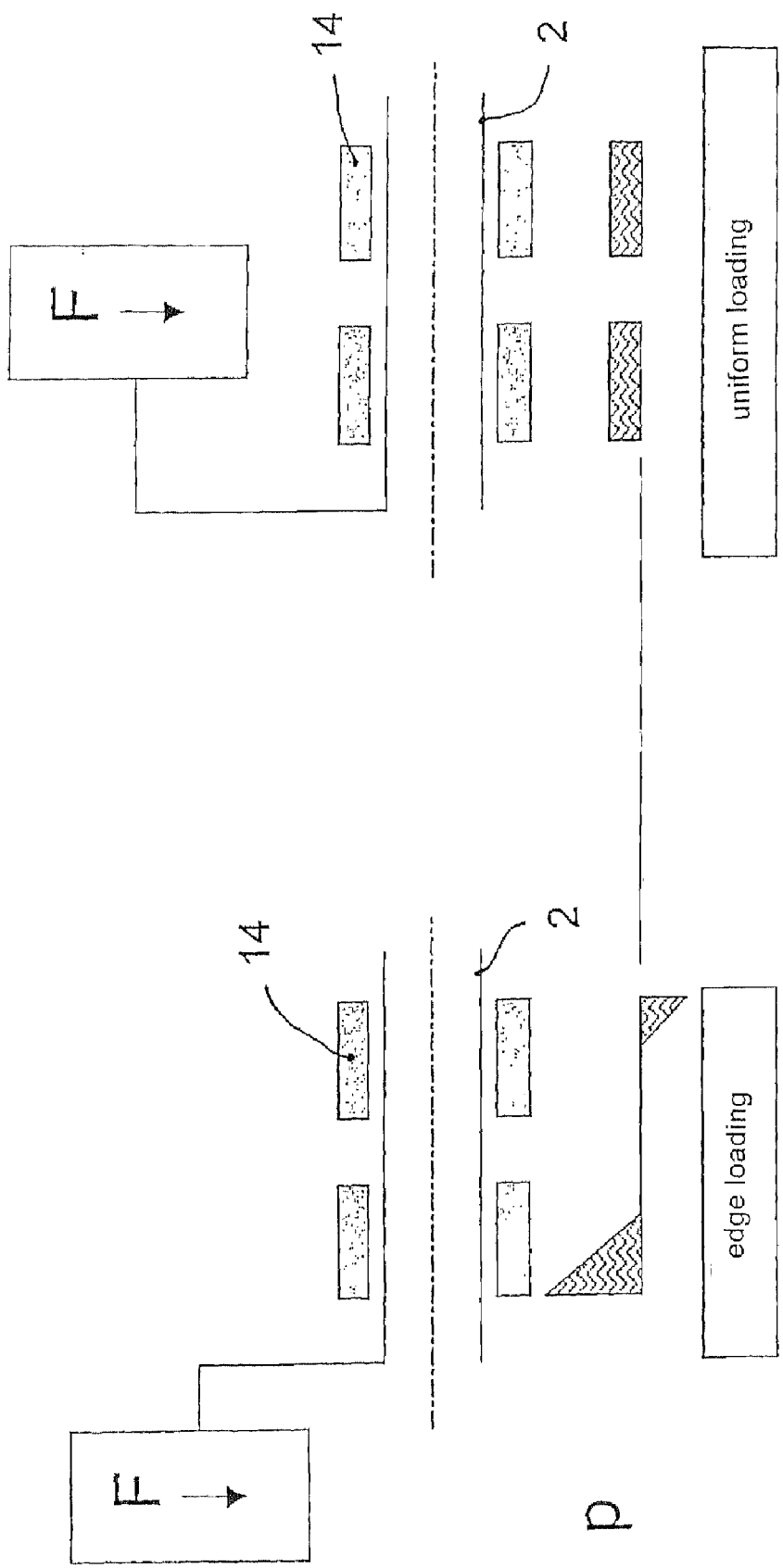
FIG. 3 shows a surface pressure distribution on slide hearings which are installed in pairs.

FIG. 3 diagrammatically shows the distribution of the surface pressure p on slide bearings 14 which are installed in pairs in a tensioning apparatus of the generic type, in the case of a centrally acting force F (right-hand image half) and in the case of an eccentrically, that is to say laterally, acting force F (left-hand image half). It can be seen from this that, in the case of a centrally acting force, uniform loading or surface pressure p can be determined between the bearing sleeve 14 and the pin 2, which is illustrated graphically here by the rectangular boxes with undulating hatching. This is very advantageous for realizing low bearing wear.

In contrast, without the structural measures according to the invention, in the case of a laterally introduced force F into the slide bearing of the left-hand image half of FIG. 3, pronounced edge loadings or surface pressures p occur which are indicated graphically here by the triangular boxes with undulating hatching.

As the force profile shows, the loading within the slide bearing is very non-uniform, force peaks in opposite directions being formed in a pronounced manner toward the ends of the slide bearing. In this case, very pronounced surface pressure forces therefore act in each case at the ends, which pronounced surface pressure forces lead to increased wear in these regions and therefore to a reduced service life.

Figure 2:
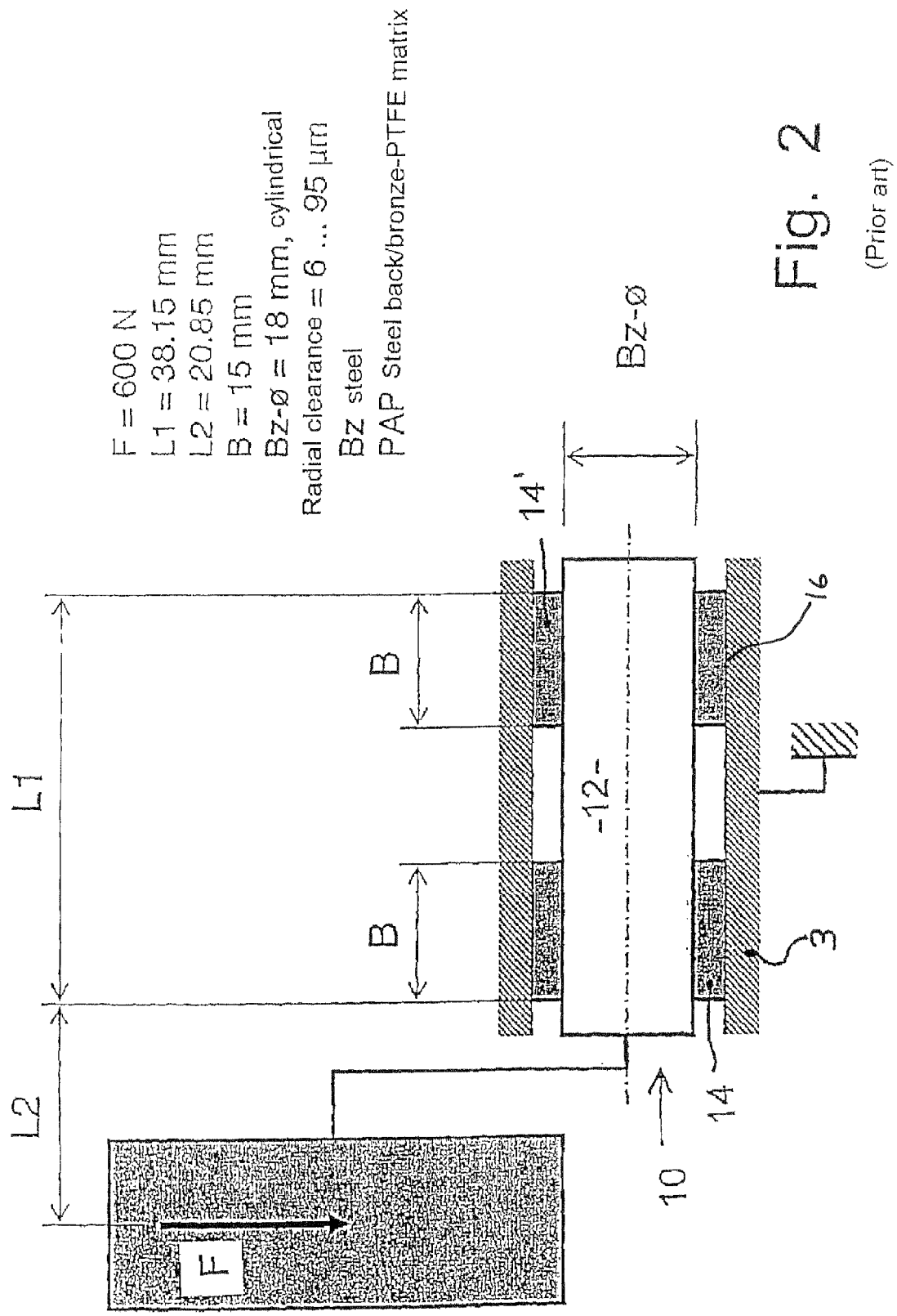
FIG. 2 shows an end profile of a pin/bearing sleeve unit according to the prior art.

FIG. 2 shows an end profile on a pin/bearing sleeve unit 10 with an eccentrically acting force F on the cylindrical pin 12 according to the prior art. Here, the pin 12 is mounted in two bearing sleeves 14, 14' which are in turn pressed into a bush 16. In this construction, the force profile within the bush/bearing sleeve unit 10 is distributed non-uniformly, pronounced force loadings prevailing at the respective edges, which pronounced force loadings again cause high wear phenomena of the pin/bearing sleeve unit (see also FIG. 3, left-hand image half).

The specifications which are listed in FIG. 2 with regard to the force F, the lengths L1, L2 and B, the diameter Bz and the materials relate to typical values in the field of use of a belt tensioning system and are specified only for exemplary explanation.

Figure 1:
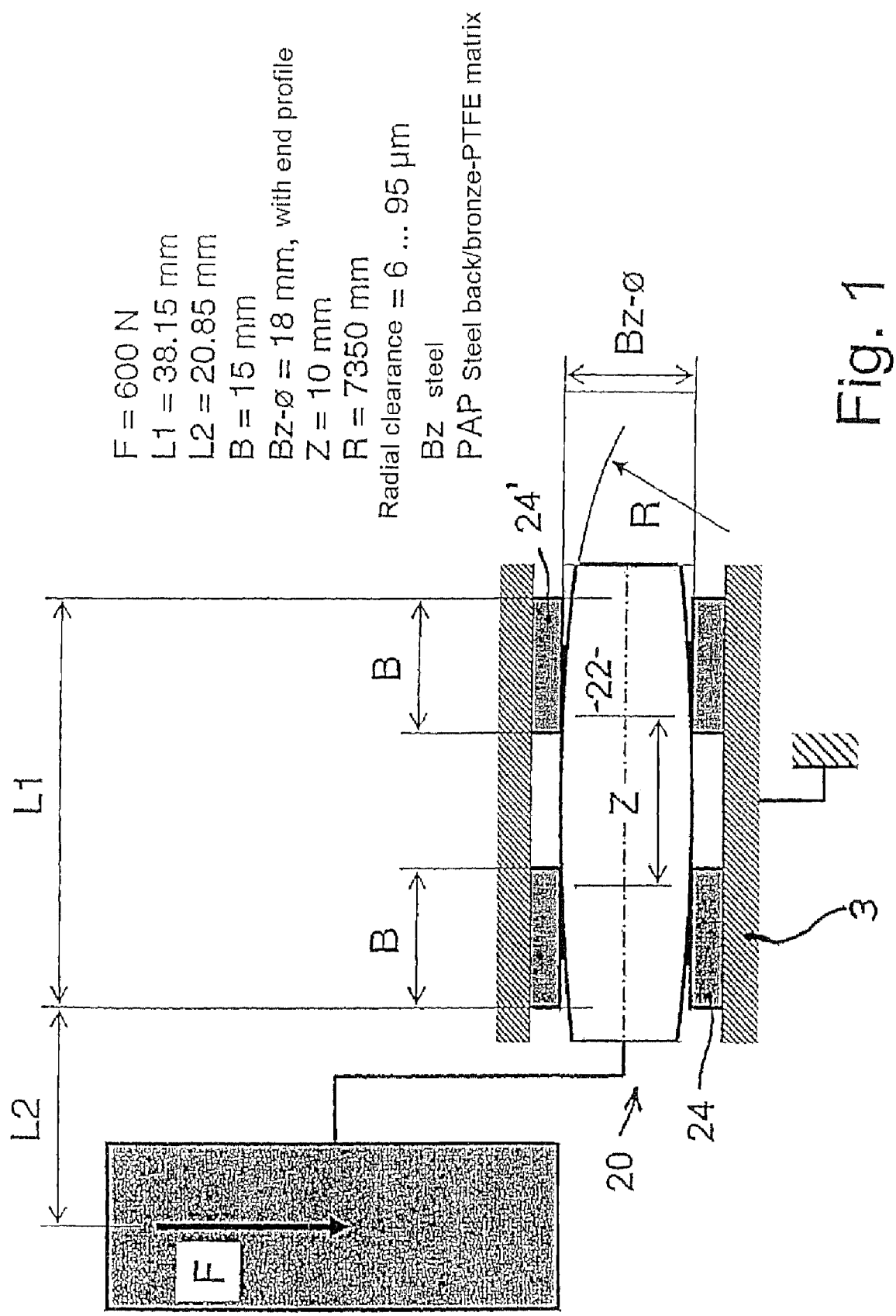
FIG. 1 shows an end profile of a pin/bearing sleeve unit according to the present invention.

FIG. 1 shows an end profile of a pin/bearing sleeve unit 20 according to the present invention. A force F also acts eccentrically on the pin 22 here. Here, the pin 22 is also likewise mounted by two bearing sleeves 24 and 24' which are arranged axially behind one another and are pressed into a hole of the housing 3. In this embodiment of the invention, the bearing sleeves 24, 24' are of cylindrical configuration, whereas, as viewed from two positions which are spaced apart by a spacing Z, the pin 22 is of tapering (spherical) configuration in a manner which extends in each case toward the axial end. Here, the tapering of the pin 22 is configured radially with a radius R. Here, the center of the spacing Z is also at the same time the axial center of the pin 22.

As a result of this targeted end profile, the surface pressure is reduced considerably in the case of an eccentric introduction of force F, as the geometry of the circumferential face of the pin 22 is already adapted to the, as it were, oblique pin loading. As a result, the loadbearing surface area between the pin 22 and the bearing sleeves 24, 24' is increased considerably in comparison with known technical solutions, as a result of which the service life of the pin/bearing sleeve unit 20 is increased with adherence to current installation stipulations. At the same time, the boundaries of use of the bush/bearing sleeve unit 20 are extended, to be precise with retention of the tolerances which are necessary for mass production for the diameter of the pin 20 and the diameters of the bearing sleeves 24, 24'.

Here, the specifications which are listed in FIG. 1 with regard to the force F, the dimensions and the materials also relate to typical values in the field of use of a belt tensioning system and are specified only for exemplary explanation.

Therefore, in the concrete exemplary embodiment of FIG. 1, it is considered advantageous if, in the case of an acting force F of 600 N, a spacing L1 of 38.15 mm between the axial ends of the bearing sleeve unit 24 and 24', an axial length B of 15 mm of the respective bearing sleeves 24, 24', a length L2 of 20.85 mm between the axial end of the bearing sleeve 24 and the introduction point of the force F into the pin 22 and a pin diameter Bz Ø of 18 mm, the spherical geometry of the two end regions of the pin circumferential face has a radius R of 7350 mm, and the starting points (or predetermined positions) of the circular arcs which are made with these radii are remote from one another by a distance Z of 10 mm. In the example which is described here, these starting points are additionally situated in each case at a spacing of 5 mm from the center of the pin 22.

The pin itself consists of the material Bz=steel. In addition to steel, the slide bearing bush consists of a sliding coating which is manufactured from a bronze-PTFE matrix.

LIST OF DESIGNATIONS

1 Belt tensioning system
2 Pin
3 Lower cylinder housing
4 Disk
5 Upper cylinder housing
6 Longitudinal axis
7 Helical spring
8 Lever
9 Screw
10 Bush/bearing sleeve unit
12 Pin
13 Friction lining
14, 14' Bearing sleeve
20 Bush/bearing sleeve unit
22 Pin
24, 24' Bearing sleeve
p Surface pressure
F Force

The invention claimed is:

1. An end profile on slide bearing complementary elements, comprising:
   a pin; and
   two bearing sleeves, which each have an inner circumferential face and an outer circumferential face, receiving a different portion of the pin and only partially contacting the pin, the pin absorbing an eccentric force which acts perpendicularly with respect to a unit which comprises the pin and the bearing sleeves,
   wherein the inner circumferential face and the outer circumferential face of each of the bearing sleeves are entirely of cylindrical configuration and the pin is of tapering configuration at each axial end, each tapering configuration extending from a predefined position toward the respective axial end.

2. The end profile on slide bearing complementary elements of claim 1, wherein the tapering of the pin is of radial configuration.

3. The end profile on slide bearing complementary elements of claim 1, wherein the predefined positions are arranged symmetrically with respect to an axial center point of the pin.

4. The end profile on slide bearing complementary elements of claim 1, wherein the predefined positions are arranged symmetrically with respect to an axial center point of the bearing sleeves.

5. The end profile on slide bearing complementary elements of claim 1, wherein the at least one bearing sleeve comprises a sliding coating of bronze-PTFE on an inner side.

* * * * *